Oct. 1, 1935.  C. C. WORTHINGTON  2,015,740
LAWN MOWER
Filed Oct. 21, 1932   2 Sheets-Sheet 1
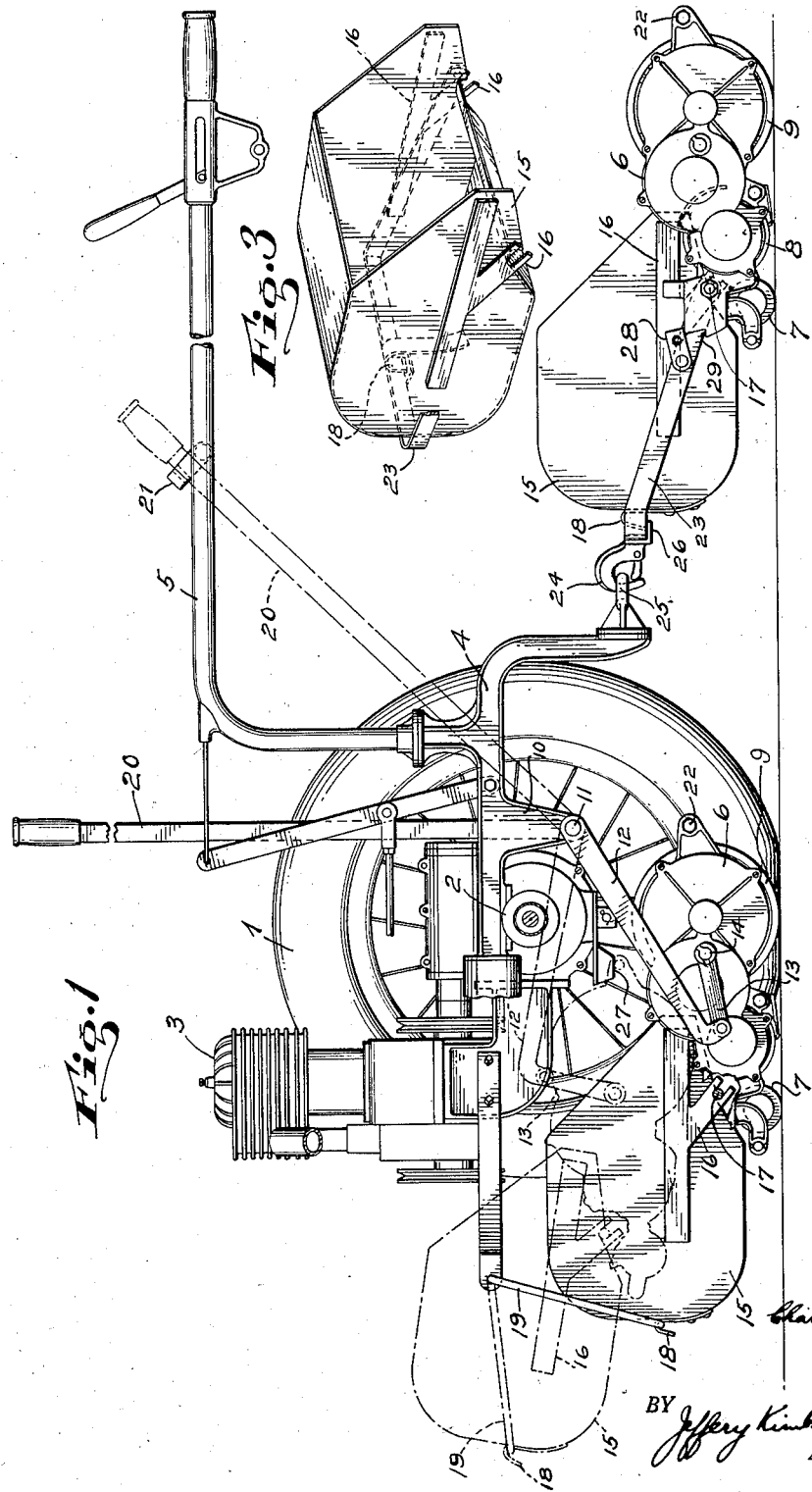
Charles C. Worthington
INVENTOR
BY Jeffery Kimball & Eggleston
ATTORNEYS.

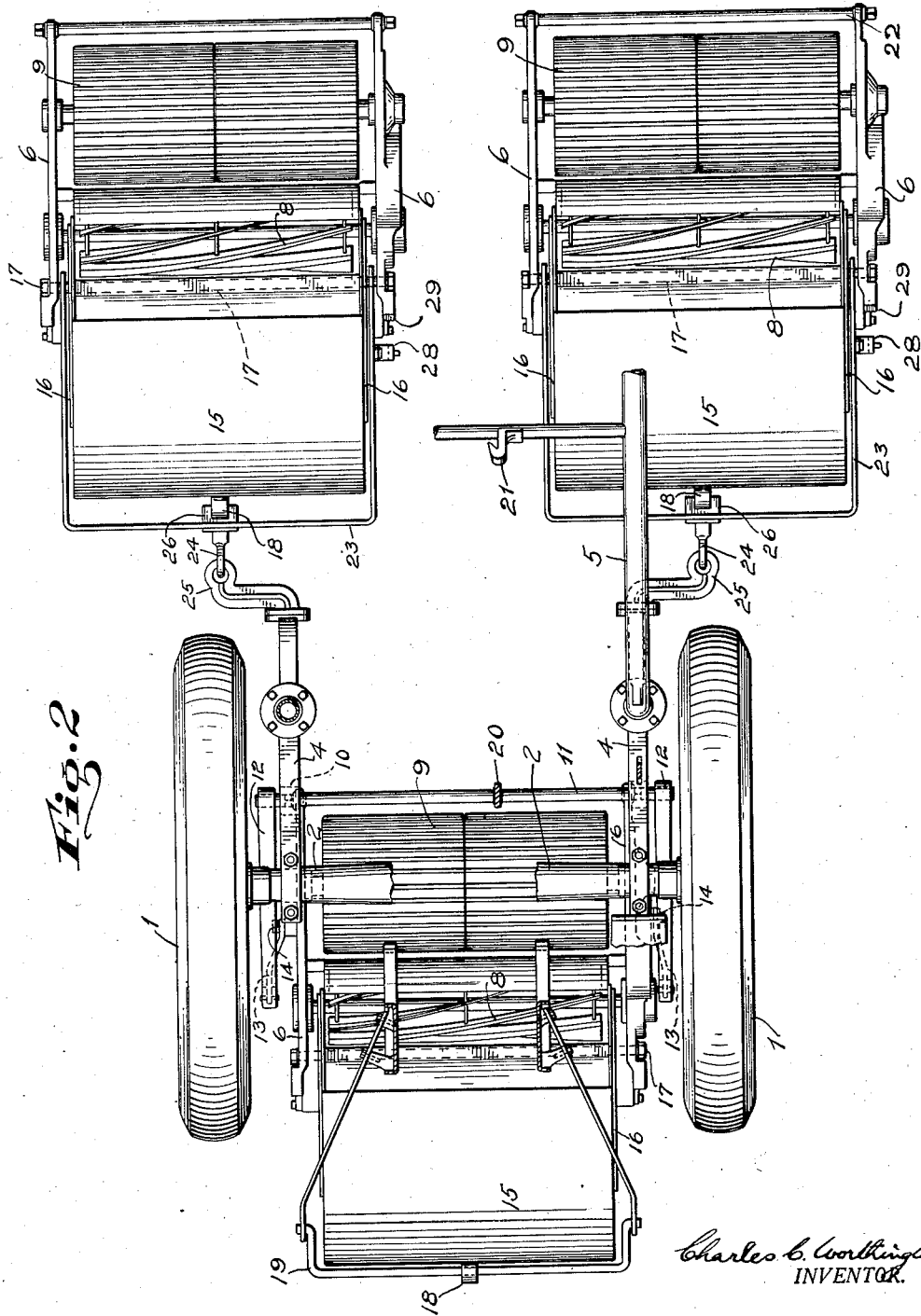

Patented Oct. 1, 1935

2,015,740

UNITED STATES PATENT OFFICE 2,015,740

LAWN MOWER

Charles C. Worthington, Dunfield, N. J.

Application October 21, 1932, Serial No. 638,853

24 Claims. (Cl. 56—7)

The invention relates to tractor-drawn lawn mowers such as the putting green gang-mower disclosed in Patent No. 1,825,109, and its object is to improve on such mower and to provide for the collection of the cuttings in suitable grass boxes, which may be identical for all units and therefore interchangeable, which are accessible and easily removable, and all supported at least in part by the power unit or tractor in such manner that, while always in proper relation to the units to receive the cuttings, the boxes impose little or no appreciable load on the mower units whereby the gang can be operated until the boxes are filled to capacity without unduly increasing the draft of the units or causing them to indent or mark the surface of the green. Further features and advantages of the invention are referred to below and illustrated in the accompanying drawings, in which:

Fig. 1 is an elevation, partly diagrammatic of a three-unit putting green gang-mower having the invention applied.

Fig. 2 is a plan view of the same, with parts broken out, and

Fig. 3 a perspective detail of the method of supporting the box on the units.

The machine illustrated is of the kind disclosed in the above-mentioned patent, although not essential to the present invention, and comprises generally a pair of main or tractor wheels 1 supporting an axle and drive housing 2 which carries the propelling motor 3. Frame members 4 are clamped to the axle housing and are rigidly fixed to the rearwardly extending members or handle bars 5 by which the machine can be steered. The foregoing and the motor controls may be of any suitable construction and arrangement.

The mowers may likewise be of any preferred self-operating unit form, those illustrated each including side frames 6, a front roller 7, adjustable as usual to vary the height of cut, a fly knife 8 with its cooperating ledger knife and rear roller 9, each mower comprising an independent unit, the fly knife of which is operated by the rear roller as it passes over the ground.

The front unit, of which but one is illustrated although the invention is adaptable to a gang with two in front, is located between the tractor wheels beneath the axle housing and motor. Journalled in a pair of lugs 10 depending from frame members 4 is a rock shaft 11 which at each end carries an arm 12 extending forwardly and downwardly adjacent the side frames of the unit, the lower end of each arm being coupled to the unit by draft links 13 pivoted on studs 14, the arm, link and stud connections being loose enough to accommodate the unit to all manner of ground undulations independently of the tractor but holding said front unit or units at all times square to the direction of travel as will be understood.

A grass box 15, which as stated is identical with all the other boxes, is arranged for support at one (its open) end on or adjacent the unit 10 and in grass receiving relation to the cutter, and at its other and heavier end for support on the tractor. In the preferred form illustrated the box, made of sheet metal, has affixed to each side of it a reinforcing cleat 16 the lower end of which is notched or forked and, projecting beyond the box, adapted to seat and also pivot vertically on the transverse tie rod 17 which unites the side frames 6 of the unit. To the front end of the box is affixed a hook member 18 adapted for support, in the case of the front unit, on a swinging bail 19 pivoted to and suspended from a part of the tractor frame as indicated. By this or like means, as the unit and tractor structure may require, the box is properly located in grass-receiving relation to the mower unit, free to pivot about the axis of tie rod 17 as the unit passes over undulations in the line of travel and likewise free to follow the tilting of the unit as the result of transverse undulations, the greater part of the weight of the box and its load, which when the grass is wet may be as much as 15 lbs., being at all times sustained by the tractor, through bail 19. The hook member 18 forms a pivotal bearing on which the box may tilt or rock with reference to the bail and tractor as it follows the movements of its unit.

Secured to shaft 11, with its upper end readily accessible for operation, is a lever arm 20 movable from the full to the dotted line position indicated in Fig. 1, to rock the shaft, whereupon through the arm 12 and draft-link 13 the entire front unit, including the grass box, is elevated to the position shown for transporting the machine from one green to another, in which raised position the unit may be locked by engaging lever arm 20 with latch 21. As lever arm 20 is moved toward the rear of the machine and the unit raised, some part at the rear of the unit, such as cross bar 22, engages a stop 27 on the tractor, preventing any forward dipping of the unit under the load of the grass box which, it will be observed, is equally accessible for removal when in the raised position.

The grass boxes are related to the rear units in generally the same manner. Each rear unit is individually coupled to the tractor, as by a draft element which preferably and as shown comprises a draft yoke 23 pivoted on the tie or cross rod 17 of the unit and provided with a hook 24 to engage an eye 25 projecting rearwardly from the tractor frame, thus permitting universal movement of the unit in following ground undulations, without restraint by the tractor. In this instance the box is supported by the draft element, as by a bracket or ledge 26 located on the draft yoke 23 to receive the end of the hook member 18 fixed on the forward end of the box as already described, whereby a large portion of the weight of the grass box and its load is transferred through hook 24, to the tractor, while, as with the front unit arrangement, the rear of the box rests pivotally on the cross rod 17 (as is the case with the front box) thus permitting the box to accommodate itself to the movement of the mower in all positions of the latter.

When travelling between greens, the rear units may also be supported in non-cutting position, without disturbing the grass boxes, as by elevating the front end of each unit and allowing it to travel on its rear roller only, or on a carrier, as disclosed in the copending application of Arthur S. Tuttle, Serial No. 621,150, filed July 7, 1932, latches 28 pivoted on draft yokes 23 being adapted to drop into notches 29 in the front of the unit frame when the latter, and the box with it, are lifted, thereby locking the joint between the draft yoke and unit.

In each case, moreover, the grass box is supported quite freely, unsecured to either tractor or unit, with the result that each box is removable for emptying by simply lifting it off its front and rear supports, and is likewise as easily replaced on any of the units with no adjustment or special setting necessary, this being true even after periods of use when the boxes have become deformed and distorted, due to the fact that the front support 18 will readily engage its bearing (bail 19 or ledge 26) notwithstanding a considerable amount of displacement which may have altered the distance between the front and rear parts of the box.

I claim:

1. In combination with a tractor, a plurality of detachable lawn mower units flexibly attached thereto and individual grass boxes for the units, each of said boxes being supported in part on the tractor and in part on its unit and movable with the unit relatively to the tractor.

2. In combination with a tractor, a gang of overlapping lawn mower units each having a flexible draft connection with the tractor permitting it individually to accommodate ground undulations, grass boxes for said units respectively, means for supporting each box in grass-receiving relation to its unit and means for sustaining the weight of each box and its load partly on the tractor and partly on its unit.

3. In combination with a tractor, a gang of overlapping lawn mower units each having a flexible draft connection with the tractor for independent accommodation to ground undulation, and each comprising a rear roller and a cutter driven thereby in front of said roller, a grass box for each unit of the gang, each said box having means at its rear end connecting it with the front of the unit and having a bearing device at its front end, and a part supported by the tractor for receiving said device and transmitting some of the box load to the tractor wheels.

4. In combination with a tractor, a gang of lawn mower units in overlapping relation, each having a flexible draft connection with the tractor permitting it to accommodate ground undulations independently of the others, and each having means for supporting it in a lifted position out of normal relation to the ground and a grass box for each mower connected thereto and supported thereby when so lifted.

5. A tractor, a pivoted grass box support depending therefrom, a mower unit having a flexible draft connection with the tractor and a grass box supported adjacent one end on the mower unit and pivoted at the other end on said depending support.

6. In combination with a tractor, an independently-operating mower unit having a flexible draft connection therewith to accommodate ground undulations independently of said tractor, a grass box supported in grass-receiving relation to the unit and means for supporting said unit and box out of their normal relation to the ground.

7. In combination with a tractor, an independently-operating mower unit having a flexible draft connection therewith, a grass box removably supported in grass-receiving relation to the unit, and partaking of the undulating movement thereof and an operating member mounted on the tractor having means for lifting said unit and box and for supporting the same so lifted, for the purpose described.

8. In combination a tractor, a lawn mower unit, draft means flexibly connecting said unit to the tractor to accommodate ground undulations independently of the tractor, a grass box connected with said unit to partake of the undulation-conforming movements thereof and lift means operating through said draft means for raising said unit and its box out of their normal relation to the ground.

9. In combination a tractor, a lawn mower unit having a fly knife rotated by the travel of the unit upon the ground, draft means flexibly connecting said unit to the tractor to accommodate ground undulations independently of the tractor, said means including a forward lever arm and a draft link extending rearwardly therefrom to said unit, a grass box in grass-receiving relation to said unit and means for operating said draft means to lift said unit bodily from the ground.

10. In a gang lawn mower, a tractor, a gang of overlapping lawn mower units, draft means flexibly connectiing one or more of said units to the tractor to accommodate ground undulations independently of the tractor, a grass box connected with said unit in grass-receiving relation thereto and partaking of the undulation movement thereof and means for operating said draft means to lift said unit and its box out of their normal relation to the ground.

11. In combination with a tractor, a mower unit connected therewith, a removable grass box, means on the tractor providing a pivotal support for the box thereon and means on the unit providing a pivotal support for the box thereon.

12. In combination with a tractor and a lawn mower unit having a draft-yoke pivoted thereto and pivotally connecting it to the tractor, a grass box having a point of bearing on said draft-yoke adjacent its connection with the tractor and having another point of bearing adjacent the unit.

13. In combination with a tractor, a lawn mower unit having a flexible draft connection therewith, a grass box supported in part by the tractor and pivotally connected to the unit by a connection permitting relative movement of the box and unit in a vertical plane to accommodate undulations in the line of travel.

14. In combination with a tractor, a lawn mower unit having a draft connection therewith permitting tilting of the unit relatively to the tractor to accommodate transverse ground undulations, a grass box connected at one end with the unit and means independent of said draft connection for supporting the other end of the grass box on the tractor, said means permitting the box to tilt with the unit.

15. A lawn mower unit having a cutter and ground-wheel drive mechanism therefor in rear of the cutter, a grass box supported in front of and in grass-receiving relation to the cutter, and a draft element horizontally pivoted to the unit and constituting a support for said grass box.

16. In combination with a tractor, a mower unit, a draft element coupling said tractor and unit and having a horizontal pivotal connection with the unit and a universally jointed connection with the tractor, and a grass box supported on said element and engaging a cross member of the unit independently thereof.

17. In combination with a tractor, a mower unit located between the wheels thereof and having a flexible draft connection thereto permitting it to accommodate ground undulations independently of the tractor, and a grass box supported in part on the tractor and in part on the unit with freedom for movement relatively to each of them.

18. In combination with a tractor, front and rear overlapping mower units flexibly coupled therewith for independent accommodation to ground undulations, a plurality of equal and interchangeable grass boxes, one for each unit, each box having a supporting member or part which can form a pivotal bearing in relation to the tractor when the box is set in place and each box having also a part which connects it in constant grass-receiving relation to its respective unit.

19. In mowing apparatus as described having a tractor and a plurality of lawn mower units flexibly coupled thereto in overlapping relation, interchangeable grass boxes for the several units, each having a means at one end for maintaining it in constant grass-receiving relation to its unit, a supporting member at the other end of said box, and a bearing member supported by the tractor to receive said supporting member, one of said members being adapted for bearing contact with the other at different distances from the unit.

20. In a gang lawn mower the combination with a tractor, a mower unit, a draft connection holding said unit square to the travel but permitting it to tilt in a vertical transverse plane independently of the tractor, a grass box connected to the front end of said unit through a pivotal joint having a transverse horizontal axis and means connecting the other end of the box to the tractor through a pivotal joint having a longitudinal axis.

21. In a gang lawn mower the combination with a tractor, a plurality of overlapping lawn mower units in front and rear positions, a draft connection between said tractor and a front unit permitting said unit to follow ground undulations independently of the tractor but holding it square to the direction of travel, a grass box connected at one end to said unit to follow the undulation-movements thereof, means independent of said unit for pivotally holding the other end of said box, a draft connection element to a rear unit permitting its independent accommodation to ground undulation and a grass box supported on said element in grass-receiving relation to said rear unit.

22. In a gang lawn mower, the combination of a tractor, overlapping lawn mower units connected thereto with freedom to follow ground undulations, the draft means for one of said units comprising a pair of forwardly directed arms pivotally mounted on the tractor or its frame work on opposite sides of a unit, and a pair of links extending rearwardly from the free ends of said arms and pivotally connected to said unit, said pivoted arms and links serving to maintain said unit square to the direction of travel while permitting undulation-conforming movement thereto.

23. In a gang lawn mower, the combination of a tractor, a lawn mower unit, draft connection means therefor permitting undulation-conforming movement to said unit independently of said tractor, a grass box connected with said unit and extending forwardly of said draft connection means and tractor-sustained means for supporting the forward part of said grass box, said last mentioned means accommodating the undulation-conforming movements of said unit and box.

24. The improvement in power-driven gang mowers of the kind designed for mowing putting greens and comprising a tractor frame structure with a plurality of independently tiltable lawn mower units flexibly connected thereto, which consists in the combination with each of the units in said gang of a grass-catching box, one end of each box being supported from said frame structure, and movable with relation thereto, and the other end of each box being connected to its unit by means causing it to follow the tilting movements thereof.

CHARLES C. WORTHINGTON.